(12) United States Patent
Heishi et al.

(10) Patent No.: US 9,728,810 B2
(45) Date of Patent: Aug. 8, 2017

(54) ELECTROLYTE AND LITHIUM ION SECONDARY BATTERY

(71) Applicant: SEKISUI CHEMICAL CO., LTD., Osaka (JP)

(72) Inventors: Masaru Heishi, Tsukuba (JP); Takuya Toyokawa, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/771,387

(22) PCT Filed: Aug. 20, 2014

(86) PCT No.: PCT/JP2014/071762
§ 371 (c)(1),
(2) Date: Aug. 28, 2015

(87) PCT Pub. No.: WO2015/025882
PCT Pub. Date: Feb. 26, 2015

(65) Prior Publication Data
US 2016/0013516 A1    Jan. 14, 2016

(30) Foreign Application Priority Data
Aug. 21, 2013 (JP) .................... 2013-171605

(51) Int. Cl.
*H01M 6/14* (2006.01)
*H01M 10/0567* (2010.01)
(Continued)

(52) U.S. Cl.
CPC ... *H01M 10/0567* (2013.01); *H01M 10/0525* (2013.01); *H01M 10/0569* (2013.01);
(Continued)

(58) Field of Classification Search
CPC ...................................................... H01M 6/14
See application file for complete search history.

(56) References Cited

U.S. PATENT DOCUMENTS

2008/0090154 A1    4/2008   Ihara et al.
2011/0045360 A1    2/2011   Deguchi
(Continued)

FOREIGN PATENT DOCUMENTS

CN    102064344 A    5/2011
CN    102629696 A    8/2012
(Continued)

OTHER PUBLICATIONS

International Search Report issued with respect to application No. PCT/JP2014/071762, mail dated Oct. 7, 2014.
(Continued)

*Primary Examiner* — Jacob Marks
(74) *Attorney, Agent, or Firm* — Greenblum & Bernstein, P.L.C.

(57) ABSTRACT

An electrolyte contains a non-aqueous solvent, a lithium salt, and a fluorine-containing ether compound represented by the following Formula (I). In the following formula, $R^1$ represents an alkyl group having 3 to 8 carbon atoms; $R^2$ represents an alkyl group having 1 carbon atom; at least 6 carbon atoms among carbon atoms bonded to the alkyl group represented by $R^1$ are substituted with fluorine atoms; and at least one hydrogen atom among hydrogen atoms bonded to the alkyl group represented by $R^2$ is substituted with a fluorine atom.

9 Claims, 2 Drawing Sheets

(51) Int. Cl.
  *H01M 10/0569*  (2010.01)
  *H01M 10/0525*  (2010.01)
(52) U.S. Cl.
  CPC .............. *H01M 2300/0025* (2013.01); *H01M 2300/0034* (2013.01); *H01M 2300/0037* (2013.01); *Y02T 10/7011* (2013.01)

(56) References Cited

U.S. PATENT DOCUMENTS

| | | | | |
|---|---|---|---|---|
| 2011/0076572 | A1* | 3/2011 | Amine | H01M 10/05 |
| | | | | 429/328 |
| 2012/0237837 | A1* | 9/2012 | Lin | H01M 4/505 |
| | | | | 429/338 |
| 2013/0280600 | A1 | 10/2013 | Uehara et al. | |
| 2014/0017572 | A1 | 1/2014 | Uehara et al. | |
| 2014/0023935 | A1 | 1/2014 | Noguchi et al. | |
| 2014/0065476 | A1* | 3/2014 | Kim | H01M 10/0567 |
| | | | | 429/207 |

FOREIGN PATENT DOCUMENTS

| | | |
|---|---|---|
| CN | 102751534 A | 10/2012 |
| EP | 0757399 A1 | 2/1997 |
| JP | 11-026015 A | 1/1999 |
| JP | 2008-176987 A | 7/2008 |
| JP | 2011-210651 A | 10/2011 |
| JP | 2013-026180 A | 2/2013 |
| JP | 2014-110235 A | 6/2014 |
| WO | 2012/127717 A1 | 9/2012 |
| WO | 2012/132060 A1 | 10/2012 |
| WO | 2012/141301 A1 | 10/2012 |
| WO | 2013/073288 A1 | 5/2013 |

OTHER PUBLICATIONS

Chinese Office Action issued with respect to Application No. 201480018952.4, dated Sep. 5, 2016.
European Search Report issued with respect to Application No. 14837902.7 dated Feb. 23, 2017.
Chinese Office Action issued with respect to Application No. 201480018952.4, dated Feb. 23, 2017.
Tadahiko Kubota et al., "Investigation of New Generation Anode with FEC as an Electrolyte Additive", The Electrochemical Society, Dec. 31, 2010, XP055346998. Retrieved from the Internet: URL: http://ma.ecsdl.org/content/MA2010-02/9/582.full.pdf.

* cited by examiner

ELECTROLYTE AND LITHIUM ION SECONDARY BATTERY

TECHNICAL FIELD

The present invention relates to an electrolyte which can be used in a lithium ion secondary battery and a lithium ion secondary battery.

Priority is claimed on Japanese Patent Application No. 2013-171605, filed Aug. 21, 2013, the content of which is incorporated herein by reference.

BACKGROUND ART

As the market for laptop computers, cellular phones, electric cars, and the like expands, the demand for secondary batteries having high energy density increases. As means for obtaining such a secondary battery having high energy density, a method of using a negative electrode material having a high capacity, a method of using a positive electrode having a high potential, and the like are under development. Conventionally, many of the general lithium ion secondary batteries have a voltage of 3.5 V to 4.2 V. However, lithium ion secondary batteries that use a positive electrode with a high potential have a potential of equal to or higher than 4.5 V, and an improvement in the energy density thereof is anticipated. If a negative electrode having a higher capacity is combined with a positive electrode, the capacity of the lithium ion secondary batteries is likely to be further increased.

However, the use of a positive electrode having a high potential leads to a problem in that the battery performance deteriorates due to the decomposition of the electrolyte. As a method for preventing the decomposition of the electrolyte, for example, PTL 1 discloses a method of adding an aliphatic compound or the like having a 1-propenyloxy group to the electrolyte. PTL 2 discloses a method of adding a specific fluorinated chain-like ether to the electrolyte. PTL 2 describes that an electrolyte obtains fluidity in this way. PTL 3 discloses a non-aqueous electrolyte in which a vinylboronic acid compound represented by a specific chemical formula is contained in an electrolyte. PTL 3 describes that a non-aqueous electrolyte results in excellent discharge capacity at the time of charge and discharge at a low temperature.

CITATION LIST

Patent Literature

[PTL 1] Japanese Unexamined Patent Application, First Publication No. 2013-26180
[PTL 2] PCT International Publication No. WO2012-141301
[PTL 3] Japanese Unexamined Patent Application, First Publication No. 2011-210651

SUMMARY OF INVENTION

Technical Problem

However, when the aliphatic compound disclosed in PTL 1 is used as an additive of an electrolyte of a lithium ion secondary battery, a problem occurs in that the decrease in capacity resulting from a charge and discharge cycle of the secondary battery becomes significant. Furthermore, a capacity retention rate relating to the charge and discharge cycle of a secondary battery which uses the electrolyte disclosed in PTLs 2 and 3 needs to be improved.

The present invention has been made in consideration of the aforementioned circumstances, and an object thereof is to provide an electrolyte which reduces the decrease in capacity resulting from the charge and discharge cycle of a lithium ion secondary battery even when a voltage used by the battery is set to be equal to or higher than 4.5 V, which is higher than 3.5 V to 4.5 V used in conventional lithium ion secondary batteries, and to provide a lithium ion secondary battery including the electrolyte.

Solution to Problem

The present inventors paid attention to the addition of a fluorine-containing ether compound to an electrolyte. Therefore, by using a fluorine-containing ether compound (for example, see Japanese Unexamined Patent Application, First Publication No. H11-26015) used in conventional lithium ion secondary batteries, the inventors evaluated the solubility and the battery performance under usage conditions (45° C., charge and discharge cycle at 1.5 V to 4.5 V) that were harsher than under conventional usage conditions. As a result, a satisfactory result was not obtained.

As a result of further examination, the present inventors found that if one of two alkyl groups which are bonded to an oxygen atom of a fluorine-containing ether compound has one carbon atom, and the other alkyl group has 3 to 8 carbon atoms, the solubility of the fluorine-containing ether compound in a non-aqueous solvent becomes excellent. Furthermore, the inventors found that by adjusting the number of fluorine atoms substituting hydrogen atoms of both of the alkyl groups, the decrease in capacity resulting from the charge and discharge cycle of the lithium ion secondary battery can be decreased. Thereby, the inventors realized the present invention. That is, the present invention provides the following means.

[1] An electrolyte including: a non-aqueous solvent; a lithium salt; and a fluorine-containing ether compound represented by the following Formula (I).

$$R^1\text{—}O\text{—}R^2 \qquad (I)$$

[in the formula, $R^1$ represents an alkyl group having 3 to 8 carbon atoms; $R^2$ represents an alkyl group having 1 carbon atom; at least six hydrogen atoms among hydrogen atoms bonded to the alkyl group represented by $R^1$ are substituted with fluorine atoms; and at least one hydrogen atom among hydrogen atoms bonded to the alkyl group represented by $R^2$ is substituted with a fluorine atom].

[2] The electrolyte according to [1], in which the content of the fluorine-containing ether compound is 1% by volume to 60% by volume with respect to the total amount of the electrolyte.

[3] The electrolyte according to [1] or [2], in which the non-aqueous solvent is a solvent mixture of ethylene carbonate (EC) and diethylene carbonate (DEC).

[4] The electrolyte according to [1] or [2], in which the non-aqueous solvent is a solvent mixture of fluorinated ethylene carbonate (FEC) and diethylene carbonate (DEC).

[5] The electrolyte according to [4], in which the content of the FEC is 30% by volume to 70% by volume with respect to the total amount of the non-aqueous solvent.

[6] The electrolyte according to any one of [1] to [5], including a boron-based compound represented by the following Formula (B-1).

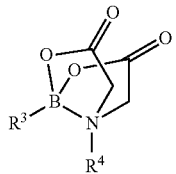

(B-1)

[in the formula, $R^3$ represents an alkyl group having 1 to 4 carbon atoms or an alkenyl group having 2 to 4 carbon atoms, and $R^4$ represents an alkyl group having 1 to 4 carbon atoms].

[7] The electrolyte according to [6], in which the content of the boron-based compound is 0.01% by mass to 5% by mass with respect to the total amount of the electrolyte.

[8] The electrolyte according to [6] or [7], in which the content of the boron-based compound is equal to or less than 5 parts by mass with respect to 100 parts by mass of the fluorine-containing ether compound.

[9] The electrolyte according to any one of [1] to [8], in which the fluorine-containing ether compound is 1,1,2,3,3,3-hexafluoropropyl difluoromethyl ether.

[10] The electrolyte according to any one of [1] to [8], in which the fluorine-containing ether compound is 2,2,3,3,4,4,5,5,5-nonafluoropentyl difluoromethyl ether.

[11] A lithium ion secondary battery including the electrolyte according to any one of [1] to [10].

Advantageous Effects of Invention

According to the electrolyte of the present invention, even when the secondary battery is used at a high potential which is equal to or higher than 4.5 V, the decrease in capacity resulting from the charge and discharge cycle of the battery can be reduced. Furthermore, according to the lithium ion secondary battery of the present invention, when the battery is used at a high potential which is equal to or higher than 4.5 V, the decrease in capacity resulting from the charge and discharge cycle of the battery can be reduced compared to conventional lithium ion secondary batteries. Accordingly, the lithium ion secondary battery of the present invention can be repeatedly used as a secondary battery having high energy density over a long period of time compared to conventional lithium ion secondary batteries.

DESCRIPTION OF EMBODIMENTS

<<Electrolyte>>

Figure 1:
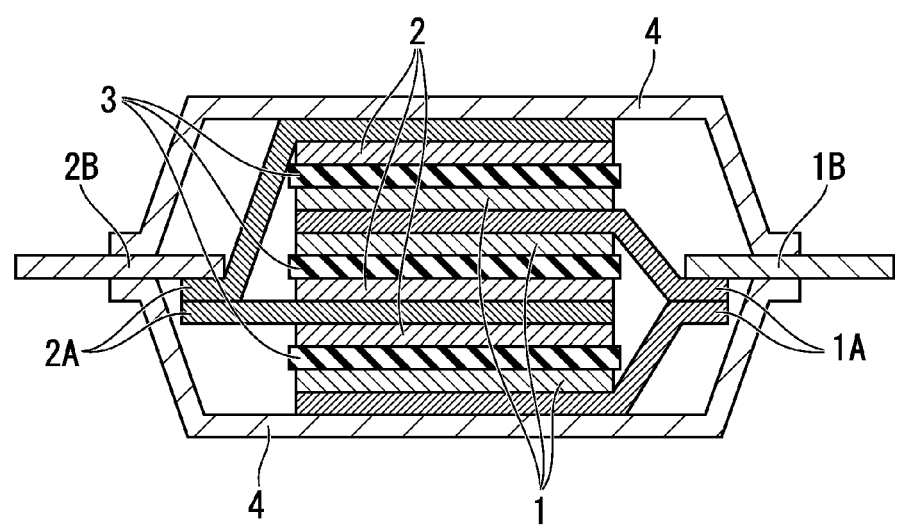
FIG. 1 is a schematic cross-sectional view showing the structure of an electrode element that a multilayer laminate-type lithium ion secondary battery has.

A first embodiment of the electrolyte of the present invention contains a non-aqueous solvent, a lithium salt as a supporting salt, and a fluorine-containing ether compound represented by the following Formula (I).

$$R^1-O-R^2 \quad (I)$$

[In the formula, $R^1$ represents an alkyl group having 3 to 8 carbon atoms; $R^2$ represents an alkyl group having 1 carbon atom; at least six hydrogen atoms among hydrogen atoms bonded to the alkyl group represented by $R^1$ are substituted with fluorine atoms; and at least one hydrogen atom among hydrogen atoms bonded to the alkyl group represented by $R^2$ is substituted with a fluorine atom.]

<Fluorine-Containing Ether Compound>

$R^1$ in Formula (I) is a linear, branched, or cyclic alkyl group. From the viewpoint of improving the solubility of the fluorine-containing ether compound in the non-aqueous solvent, $R^1$ is preferably a linear or branched alkyl group, and more preferably a linear alkyl group.

From the viewpoint of improving the solubility of the fluorine-containing ether compound in the non-aqueous solvent, the number of carbon atoms constituting the alkyl group represented by $R^1$ is preferably 3 to 6 and more preferably 3 to 5.

Among the hydrogen atoms constituting the alkyl group represented by $R^1$, at least six hydrogen atoms are substituted with fluorine atoms. All of the hydrogen atoms constituting the alkyl group represented by $R^1$ may be substituted with fluorine atoms, but it is preferable for $R^1$ to have at least one hydrogen atom.

Among the hydrogen atoms constituting the alkyl group, that is, a methyl group represented by $R^2$, at least one hydrogen atom is substituted with a fluorine atom. All of the hydrogen atoms constituting the methyl group represented by $R^2$ may be substituted with fluorine atoms, but it is preferable for $R^2$ to have at least one hydrogen atom. That is, the following Formula (I') is preferable.

$$R^1-O-CHF_2 \quad (I')$$

[In the formula, $R^1$ represents an alkyl group having 3 to 8 carbon atoms, and at least six hydrogen atoms among hydrogen atoms bonded to the alkyl group represented by $R^1$ are substituted with fluorine atoms.]

Examples of more preferable compounds among the group of fluorine-containing ether compounds represented by Formula (I) include a compound represented by the following Formula (I-a).

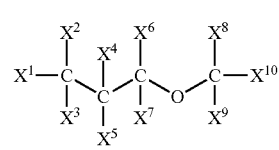

(I-a)

[In the formula, each of $X^1$ to $X^{10}$ represents a hydrogen atom or a fluorine atom; at least six of $X^1$ to $X^7$ are fluorine atoms; and at least one of $X^8$ to $X^{10}$ is a fluorine atom.]

In Formula (I-a), it is preferable that any one of $X^4$ to $X^7$ be a hydrogen atom, and it is more preferable that $X^4$ or $X^5$ be a hydrogen atom.

In Formula (I-a), it is preferable that any one or two of $X^8$ to $X^{10}$ be hydrogen atoms, and it is more preferable that any one of $X^8$ to $X^{10}$ be a hydrogen atom.

As the fluorine-containing ether compound in the electrolyte of the present embodiment, compounds represented by the following Formulae (I-a-1) to (I-a-6) are even more preferable. Among these, 1,1,2,3,3,3-hexafluoropropyl difluoromethyl ether represented by the following Formula (I-a-1) is particularly preferable.

$$CF_3-CHF-CF_2-O-CHF_2 \quad (I\text{-}a\text{-}1)$$

$$CF_3-CF_2-CHF-O-CHF_2 \quad (I\text{-}a\text{-}2)$$

$$CF_3-CHF-CF_2-O-CH_2F \quad (I\text{-}a\text{-}3)$$

$$CF_3-CF_2-CHF-O-CH_2F \quad (I\text{-}a\text{-}4)$$

$$CF_3-CHF-CF_2-O-CF_3 \quad (I\text{-}a\text{-}5)$$

$$CF_3-CF_2-CHF-O-CF_3 \quad (I\text{-}a\text{-}6)$$

Examples of preferable compounds among the group of the fluorine-containing ether compounds represented by Formula (I) include compounds represented by the following Formulae (I″) and (I‴).

$$R^{1'}-CH_2-O-R^2 \quad (I'')$$

$$R^{1'}-CH_2-O-CHF_2 \quad (I''')$$

[In the formula, $R^{1'}$ represents an alkyl group having 3 to 7 carbon atoms; at least six hydrogen atoms among hydrogen atoms bonded to the alkyl group represented by $R^{1'}$ are substituted with fluorine atoms; $R^2$ represents an alkyl group having 1 carbon atom; and at least one hydrogen atom among hydrogen atoms bonded to the alkyl group represented by $R^2$ is substituted with a fluorine atom.]

Examples of more preferable compounds among the group of the fluorine-containing ether compounds represented by Formula (I) include a compound represented by the following Formula (I-b).

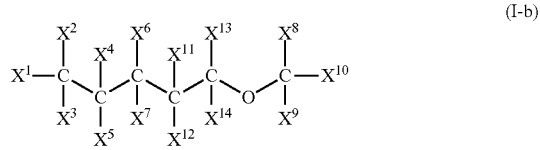

(I-b)

[In the formula, each of $X^1$ to $X^{14}$ represents a hydrogen atom or a fluorine atom; at least six of $X^1$ to $X^7$ and $X^{11}$ to $X^{14}$ are fluorine atoms; and at least one of $X^8$ to $X^{10}$ is a fluorine atom.]

In Formula (I-b), it is preferable that at least one of $X^{11}$ to $X^{14}$ be a hydrogen atom; it is more preferable that at least one of $X^{13}$ and $X^{14}$ be a hydrogen atom; and it is even more preferable that both of $X^{13}$ and $X^{14}$ be hydrogen atoms.

In Formula (I-b), it is preferable that any one or two of $X^8$ to $X^{10}$ be hydrogen atoms, and it is more preferable that any one of $X^8$ to $X^{10}$ be a hydrogen atom.

As the fluorine-containing ether compound in the electrolyte of the present embodiment, compounds represented by the following Formulae (I-b-1) to (I-b-6) are even more preferable. Among these, 2,2,3,3,4,4,5,5,5-nonafluoropentyl difluoromethyl ether represented by the following Formula (I-b-1) is particularly preferable.

$$CF_3-CF_2-CF_2-CF_2-CH_2-O-CHF_2 \quad (I\text{-}b\text{-}1)$$

$$CF_3-CF_2-CF_2-CF_2-CHF-O-CHF_2 \quad (I\text{-}b\text{-}2)$$

$$CF_3-CF_2-CF_2-CHF-CHF-O-CHF_2 \quad (I\text{-}b\text{-}3)$$

$$CF_3-CF_2-CF_2-CF_2-CH_2-O-CF_3 \quad (I\text{-}b\text{-}4)$$

$$CF_3-CF_2-CF_2-CF_2-CHF-O-CF_3 \quad (I\text{-}b\text{-}5)$$

$$CF_3-CF_2-CF_2-CHF-CHF-O-CF_3 \quad (I\text{-}b\text{-}6)$$

The electrolyte of the present embodiment may contain one kind of the fluorine-containing ether compound or two or more kinds thereof.

The content of the fluorine-containing ether compound is preferably 1% by volume to 60% by volume, more preferably 3% by volume to 30% by volume, and even more preferably 5% by volume to 20% by volume, with respect to the total amount (total volume) of the electrolyte of the present embodiment.

<Non-Aqueous Organic Solvent>

The non-aqueous solvent in the electrolyte of the present embodiment can stably dissolve the fluorine-containing ether compound, and is preferably an organic solvent that can also dissolve a lithium salt as the aforementioned supporting salt. Examples of the organic solvent include a carbonic acid ester compound such as ethylene carbonate (EC), propylene carbonate, butylene carbonate, dimethyl carbonate, methyl ethyl carbonate, diethyl carbonate (DEC), or vinylene carbonate; a fluorine-containing carbonic acid ester compound formed when at least any one of hydrogen atoms of the aforementioned carbonic acid ester compound is substituted with a fluorine atom; a lactone compound such as γ-butyrolactone; a carboxylic acid ester compound such as methyl formate, methyl acetate, or methyl propionate; an ether compound such as tetrahydrofuran or dimethoxyethane; a nitrile compound such as acetonitrile; and a sulfone compound such as sulfolane. One kind of the organic solvent may be used singly, or two or more kinds thereof may be used concurrently.

The organic solvent is preferably a solvent mixture composed of two or more kinds selected from the group consisting of the carbonic acid ester compound and the fluorine-containing carbonic acid ester compound. The mixing ratio between the respective solvents in the solvent mixture can be determined in consideration of the solubility and stability of the fluorine-containing ether compound and the lithium salt.

Preferable examples of the solvent mixture include a solvent mixture of ethylene carbonate (EC) and diethylene carbonate (DEC). A ratio (volume ratio) of EC:DEC is preferably 10:90 to 90:10, more preferably 20:80 to 50:50, and even more preferably 30:70 to 40:60.

Preferable examples of the solvent mixture include a solvent mixture of monofluoroethylene carbonate (FEC) and diethylene carbonate (DEC). A ratio (volume ratio) of FEC:DEC is preferably 35:65 to 65:35, more preferably 40:60 to 60:40, and even more preferably 45:55 to 55:45.

From the viewpoint of reducing the decrease in capacity resulting from the charge and discharge cycle of the lithium ion secondary battery, the content of FEC is preferably 30% by volume to 70% by volume with respect to the total amount (total volume) of the non-aqueous solvent.

<Lithium Salt>

As the lithium salt constituting the electrolyte of the present embodiment, a lithium salt used in known lithium ion secondary batteries can be used. Specific examples of the lithium salt include lithium hexafluorophosphate (LiPF$_6$), lithium tetrafluoroborate (LiBF$_4$), lithium bisfluorosulfonylimide (LiFSI), lithium bis(trifluoromethanesulfonyl)imide (LiN(SO$_2$CF$_3$)$_2$, LiTFSI), and the like. One kind of the lithium salt may be used singly, or two or more kinds thereof may be used concurrently.

The content of the lithium salt with respect to the total amount of the electrolyte of the present embodiment is not particularly limited. However, for example, the content of the lithium salt can be regulated such that the concentration of lithium atoms (Li) preferably becomes 0.2 mol/L to 3.0 mol/L, and more preferably becomes 0.4 mol/L to 2.0 mol/L.

<Optional Component>

The electrolyte of the present embodiment may contain an optional component in addition to the non-aqueous solvent, the lithium salt, and the fluorine-containing ether compound, within a range that does not impair the effects of the present invention. The optional component may be appropriately selected according to the purpose and is not particularly limited.

<Boron-Based Compound>

The electrolyte of the present embodiment may contain, as the optional component, a boron-based compound represented by the following Formula (B-1).

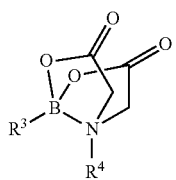
(B-1)

[In the formula, R$^3$ represents an alkyl group having 1 to 4 carbon atoms or an alkenyl group having 2 to 4 carbon atoms, and R$^4$ represents an alkyl group having 1 to 4 carbon atoms.]

When R$^3$ in Formula (B-1) represents an alkyl group, from the viewpoint of reducing the decrease in capacity resulting from the charge and discharge of the lithium ion secondary battery, the alkyl group is preferably linear or branched, and more preferably linear. The number of carbon atoms of the alkyl group is preferably 1 to 3 and more preferably 1 or 2.

When R$^3$ in Formula (B-1) represents an alkenyl group, from the viewpoint of reducing the decrease in capacity resulting from the charge and discharge of the lithium ion secondary battery, the alkenyl group is preferably a vinyl group, a 1-propenyl group, or a 2-propenyl group (an allyl group), more preferably a vinyl group or an allyl group, and even more preferably a vinyl group.

R$^4$ in Formula (B-1) represents a linear, branched, or cyclic alkyl group. From the viewpoint of improving the solubility of the boron-based compound in the non-aqueous solvent, the alkyl group is preferably a linear or branched alkyl group and more preferably a linear alkyl group.

From the viewpoint of improving the solublity of the boron-based compound in the non-aqueous solvent, the number of carbon atoms constituting the alkyl group represented by R$^4$ is preferably 1 to 3, more preferably 1 or 2, and even more preferably 1.

Preferable examples of the compound represented by Formula (B-1) include a boron-containing ester such as a boron-containing methyl ester or a boron-containing ethyl ester. Examples of the boron-containing methyl ester include a vinyl boronic acid (N-methyliminodiacetic acid) methyl ester, an allyl boronic acid (N-methyliminodiacetic acid) methyl ester, and the like. Examples of the boron-containing ethyl ester include a vinyl boronic acid (N-methyliminodiacetic acid) ethyl ester, an allyl boronic acid (N-methyliminodiacetic acid) ethyl ester, and the like. Among these, particularly, if a vinyl boronic acid (N-methyliminodiacetic acid) methyl ester represented by the following Formula (B-1-s) is used, the decrease in capacity of the lithium ion secondary battery can be further reduced.

The electrolyte of the present embodiment may contain one kind of the boron-based compound represented by Formula (B-1) or two or more kinds thereof

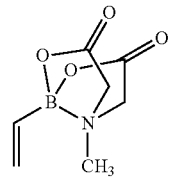
(B-1-s)

The content of the boron-based compound is preferably 0.01% by mass to 5% by mass, more preferably 0.03% by mass to 1% by mass, and even more preferably 0.06% by mass to 0.5% by mass, with respect to the total amount of the electrolyte of the present embodiment.

In the electrolyte of the present embodiment, the content of the boron-based compound is preferably equal to or less than 5 parts by mass and more preferably equal to or less than 1 part by mass, with respect to 100 parts by mass of the fluorine-containing ether compound.

<Method for Preparing Electrolyte>

The method for preparing the electrolyte of the present embodiment may be a method which makes it possible to mix together the non-aqueous solvent, the lithium salt, the fluorine-containing ether compound, and the optional component that is added if necessary and to make it possible to uniformly dissolve or disperse these components. The electrolyte of the present embodiment can be prepared by the same method as the method for preparing known electrolytes.

<<Lithium Ion Secondary Battery>>

The lithium ion secondary battery of the present invention includes the aforementioned electrolyte of the present invention. As a constitution other than the electrolyte, the constitution of conventionally known lithium ion secondary batteries can be adopted.

Hereinafter, an embodiment having the adoptable constitution will be described.

For example, the lithium ion secondary battery of the present embodiment is constituted such that an electrode element in which a positive electrode and a negative electrode are disposed to face each other and the electrolyte are included in an outer sheath. The shape of the secondary battery is not particularly limited, and the secondary battery may be any of a cylindrical secondary battery, a rolled flat square-type secondary battery, a square laminate-type secondary battery, a coin-type secondary battery, a rolled flat laminate-type secondary battery, and a multilayer laminate-type secondary battery. Among these, a multilayer laminate-type secondary battery is preferable. Hereinafter, the multilayer laminate-type secondary battery will be described as an example of the present embodiment.

FIG. 1 is a schematic cross-sectional view showing the structure of a battery element (electrode element) that the multilayer laminate-type secondary battery has. In the electrode element, a plurality of positive electrodes 1 and a plurality of negative electrodes 2 are formed by being laminated on each other by interposing separators 3 therebetween. Positive electrode current collectors 1A that the respective positive electrodes 1 have are electrically connected to each other by being welded to each other at the end portions thereof that are not covered with a positive electrode-active material. Furthermore, a positive electrode lead tab 1B is welded to the aforementioned welding portion. Negative electrode current collector 2A that the respective negative electrodes 2 have are electrically connected to each other by being welded to each other at the end portions thereof that are not covered with a negative electrode-active material. Furthermore, a negative electrode lead tab 2B is welded to the aforementioned welding portion.

<Negative Electrode>

The negative electrode is formed by binding a negative electrode-active material on the negative electrode current collector with a binder for a negative electrode so as to cover the the negative electrode current collector. As the negative electrode-active material, for example, it is possible to use any one or more materials among (a) a carbon material, (b) a metal, and (c) a metal oxide. Examples of a combination of these materials include a combination of the (a) carbon material and the (b) metal, a combinatin of the (a) carbon material and the (c) metal oxide, a combinatin of the (b) metal and the (c) metal oxide, and a combination of the (a) carbon material, the (b) metal, and the (c) metal oxide. Among these combinations, a combination is preferable which is composed of the (a) carbon material and the (c) metal oxide or a combination of the (a) carbon material that can absorb, store, and release lithium ions, the (b) metal that can form an alloy together with lithium, and the (c) metal oxide that can absorb, store, and release lithium ions is preferable.

As the (a) carbon material, it is possible to use graphite, amorphous carbon, diamond-like carbon, carbon nanotubes, or a complex of these. The graphite having a high degree of crystallinity is preferable because this material has a high degree of electric conductivity, excellently adheres to the positive electrode current collector composed of a metal such as copper, and exhibits excellent voltage plateau. Meanwhile, the amorphous carbon having a low degree of crystallinity is preferable because this material undergoes a relatively small extent of volume expansion and thus brings about a strong effect of relieving volume expansion of the entirety of the negative electrodes, and does not easily cause deterioration resulting from non-uniformity such as crystal grain boundary and crystal defect.

As the (b) metal, it is possible to use Al, Si, Pb, Sn, In, Bi, Ag, Ba, Ca, Hg, Pd, Pt, Te, Zn, La, or an alloy containing two or more kinds of these metals. Particularly, the negative electrode preferably contains silicon (Si) as the (b) metal.

As the (c) metal oxide, it is possible to use silicon oxide, aluminum oxide, tin oxide, indium oxide, zinc oxide, lithium oxide, or a complex of these. Particularly, the negative electrode preferably contains silicon oxide which is relatively stable and dose not easily react with other compounds.

The (c) metal oxide is preferably an oxide of a metal constituting the (b) metal. Furthermore, from the viewpoint of improving the electric conductivity of the (c) metal oxide, to the (c) metal oxide, one kind or two or more kinds of elements selected from nitrogen, boron, and sulfur may be added in an amount of, for example, 0.1% by mass to 5% by mass.

The (c) metal oxide preferably has an amorphous structure as a whole or in a portion thereof. The (c) metal oxide having an amorphous structure can inhibit the volume expansion of the (a) carbon material and the (b) metal, which are other negative electrode-active materials, and can inhibit the decomposition of the electrolyte containing the fluorine-containing ether compound. The decomposition inhibitory mechanism is unclear but is presumed to be as below. That is, having an amorphous structure, the (c) metal oxide may exert an influence on the formation of a film in the interface between the (a) carbon material and the electrolyte. In addition, it is considered that the amorphous structure has a relatively small number of factors resulting from non-uniformity such as grain boundary and crystal defect. The state in which the (c) metal oxide has an amorphous structure as a whole or in a portion thereof can be confirmed by X-ray diffraction analysis (general XRD analysis). Specifically, when the (c) metal oxide does not have an amorphous structure, a sharp peak inherent to the (c) metal oxide is observed. However, when the (c) metal oxide has an amorphous structure as a whole or in a portion thereof, the peak inherent to the (c) metal oxide is observed as a broad peak.

It is preferable that the entirety of the (b) metal or a portion thereof be dispersed in the (c) metal oxide. If at least a portion of the (b) metal is dispersed in the (c) metal oxide, the volume expansion of the entire negative electrodes can be further inhibited, and the decomposition of the electrolyte can also be inhibited. The state in which the entirety of the (b) metal or a portion thereof is dispersed in the (c) metal oxide can be confirmed by concurrently using transmisssion electron microscopy (general TEM) and energy dispersive X-ray spectroscopy (general EDX analysis). Specifically, a cross section of a sample containing particles of the (b) metal is observed, the oxygen concentration of particles of the (b) metal dispersed in the (c) metal oxide is measured, and in this way, it is possible to confirm that the metal constituting the particles of the (b) metal is not an oxide.

The negative electrode-active material which contains the (a) carbon material, the (b) metal, and the (c) metal oxide and in which the (c) metal oxide has an amorphous stucture as a whole or in a portion thereof, and the entirety or a portion of the (b) metal is dispersed in the (c) metal oxide, can be prepared by a known method. That is, by performing CVD treatment on the (c) metal oxide in an atmosphere containing organic gas such as methane gas, it is possible to obtain a complex in which the (b) metal in the (c) metal oxide forms nanoclusters, and the surface of the complex is covered with the (a) carbon material. Furthermore, by mixing the (a) carbon material, the (b) metal, and the (c) metal oxide together by mechanical milling, the aforementioned negative electrode-active material can be prepared.

The content of each of the (a) carbon material, the (b) metal, and the (c) metal oxide with respect to the total amount of the negative electrode-active material is not particularly limited. The content of the (a) carbon material is preferably 2% by mass to 50% by mass and more preferably 2% by mass to 30% by mass, with respect to the total amount of the (a) carbon material, the (b) metal, and the (c) metal oxide. The content of the (b) metal is preferably 5% by mass to 90% by mass and more preferably 20% by mass to 50% by mass, with respect to the total amount of the (a) carbon material, the (b) metal, and the (c) metal oxide. The content of the (c) metal oxide is preferably 5% by mass to 90% by mass and more preferably 40% by mass to 70% by mass, with respect to the total amount of the (a) carbon material, the (b) metal, and the (c) metal oxide.

The content of the (a) carbon material may be 0% with respect to the total amount of the negative electrode-active material. In this case, the total mass of the (b) metal and the (c) metal oxide may be 100% by mass with respect to the total amount of the negative electrode material. In addition, instead of the negative electrode-active material, a negative electrode material composed solely of the (b) metal or the (c) metal oxide may be used.

The shape of the (a) carbon material, the (b) metal, and the (c) metal oxide is not particularly limited. For example, they may have a particle shape. For instance, a constitution may be adopted in which the average particle size of the (b) metal is smaller than the average particle size of the (a) carbon material and the average particle size of the (c) metal oxide. If such a constitution is adopted, the (b) metal, of which the volume changes little at the time of charge and discharge, has a relatively small particle size, and the (a) carbon material or the (c) metal oxide of which the volume changes greatly has a relatively large particle size. Accordingly, the generation of dendrites and the pulverization of the alloy are effectively inhibited. In addition, in the process of charge and discharge, particles with a large particle size, particles with a small particle size, and then particles with a large particle size sequentially absorb, store, and release lithium. Consequently, the occurrence of residual stress and residual strain is inhibited. The average particle size of the (b) metal is, for example, equal to or less than 20 μm and is preferably equal to or less than 15 μm.

The average particle size of the (c) metal oxide is preferably equal to or less than ½ of the average particle size of the (a) carbon material, and the average particle size of the (b) metal is preferably equal to or less than ½ of the average particle size of the (c) metal oxide. It is more preferable that the average particle size of the (c) metal oxide is equal to or less than ½ of the average particle size of the (a) carbon material, and that, simultaneously, the average particle size of the (b) metal is equal to or less than ½ of the average particle size of the (c) metal oxide. If the average particle size is controlled to be within the above range, the effect of relieving volume expansion of the metal and the alloy phase can be more effectively obtained, and a secondary battery in which the energy densty, the cycle life, and the efficiency are well balanced can be obtained. More specifically, the average particle size of the (c) silicon oxide is preferably equal to or less than ½ of the average particle size of the (a) graphite, and the average particle size of the (b) silicon is preferably equal to or less than ½ of the average particle size of the (c) silicon oxide. More specifically, the average particle size of the (b) silicon is, for example, equal to or less than 20 μm and preferably equal to or less than 15 μm.

As the aforementioned binder for a negative electrode, it is possible to use polyvinylidene fluoride, a vinylidene fluoride-hexafluoropropylene copolymer, a vinylidene fluoride-tetrafluoroethylene copolymer, styrene-butadiene copolymer rubber, polytetrafluoroethylene, polypropylene, polyethylene, polyimide, polyamideimide, and the like. Among these, owing to its strong binding ability, polyimide or polyamideimide is preferable. From the viewpoint of achieving balance between "a sufficient binding force" and "high energy" having a trade-off relationship with each other, the amount of the used binder for a negative electrode is preferably 5 parts by mass to 25 parts by mass with respect to 100 parts by mass of the negative electrode-active material.

As the negative electrode current collector, in view of electrochemical stability, aluminum, nickel, copper, silver, and an alloy containing these metals are preferable. The shape of the negative electrode current collector is not particularly limited, and examples thereof include a foil shape, a flat plate shape, and a mesh shape.

Examples of the method for preparing the negative electrode include a method of forming a negative electrode-active material layer which contains the negative electrode-active material and the binder for a negative electrode on the negative electrode current collector. The negative electrode-active material layer can be formed by, for example, a doctor blade method or a die coater method. The negative electrode-active material layer may be formed in advance on any type of support; then a thin film of aluminum, a thin film of nickel, or a thin film of an alloy containing aluminum or nickel may be formed on the negative electrode-active material layer by a method such as vapor deposition or sputtering; and the thin film may be used as the negative electrode current collector. The thin film can be formed by, for example, a CVD method or a sputtering method.

<Positive Electrode>

The positive electrode is formed by binding a positive electrode-active material on the positive electrode current collector with a binder for a positive electrode so as to cover the positive electrode current collector, for example.

Examples of the positive electrode-active material include lithium manganate having a lamella structure or lithium manganate having a spinel structure, such as $LiMnO_2$ or $Li_xMn_2O_4$ (0<x<2); $LiCoO_2$, $LiNiO_2$, or a substance obtained by substituting a portion of these transition metals with other metals; a lithium transition metal oxide in which the content of a specific transition metal such as $LiNi_{1/3}Co_{1/3}Mn_{1/3}O_2$ does not exceed 50%; a substance composed of the aforementioned lithium transition metal oxide containing Li in an excess amount which is greater than that of the stoichiometric composition; and the like. Particularly, $Li_\alpha Ni_\beta Co_\gamma Al_\delta O_2$ ($1 \leq \alpha \leq 1.2$, $\beta+\gamma+\delta=1$, $\beta \geq 0.7$, $\gamma \leq 0.2$) or $Li_\alpha Ni_\beta Co_\gamma Mn_\delta O_2$ ($1 \leq \alpha \leq 1.2$, $\beta+\gamma+\delta=1$, $\beta \geq 0.6$, $\gamma \leq 0.2$) is preferable. One kind of the positive electrode-active material can be used singly, or two or more kinds thereof can be used in combination.

As the binder for a positive electrode, the same binder as the binder for a negative electrode can be used. From the viewpoint of versatility and low costs, polyvinylidene fluoride is preferable. From the viewpoint of achieving balance between "a sufficient binding force" and "high energy"

having a trade-off relationship with each other, the amount of the used binder for a positive electrode is preferably 2 parts by mass to 10 parts by mass with respect to 100 parts by mass of the positive electrode-active material.

As the positive electrode current collector, the same current collector as the negative electrode current collector can be used.

For the purpose of reducing impedance, a conductive auxiliary material may be added to the positive electrode-active material layer containing the positive electrode-active material. Examples of the conductive auxiliary material include carbonaceous fine particles such as graphite, carbon black, and acetylene black.

<Separator>

As the aforementioned separator, it is possible to use a porous film such as polypropylene or polyethylene, non-woven fabric, or a laminate in which the aforementioned materials are laminated on each other.

<Outer Sheath>

The aforementioned outer sheath just needs to be an outer sheath which is stable with respect to the electrolyte and has sufficient vapor barrier properties. For example, in a case of a multilayer laminate-type secondary battery, as the outer sheath, it is possible to use a laminate film of aluminum, polypropylene coated with silica, polyethylene, and the like. Particularly, from the viewpoint of inhibiting the volume expansion, it is preferable to use an aluminum laminate film.

EXAMPLES

Hereinafter, examples will be described so as to more specifically explain the present invention. However, the present invention is not limited to the following examples.

Example 1

<Positive Electrode>

The positive electrode current collector 1A composed of aluminum foil (thickness: 20 µm) was coated with slurry which contained 92% by mass of spinel-type $LiNi_{0.5}Mn_{1.5}O_4$, 4% by mass of Ketjen black, and 4% by mass of polyvinylidene fluoride, and the slurry was dried, thereby preparing a positive electrode 1 having a thickness of 175 µm. A double-sided electrode which was obtained by coating both surfaces of the positive electrode current collector 1A with the positive electrode 1 and drying the positive electrode 1 was also prepared in the same manner.

<Negative Electrode>

The negative electrode current collector 2A composed of copper foil (thickness: 10 µm) was coated with slurry which contained 85% by mass of SiO having an average particle size of 15 µm and 15% by mass of polyamic acid, and the slurry was dried, thereby preparing a negative electrode 2 having a thickness of 46 µm. The prepared negative electrode was annealed for 3 hours at 350° C. in a nitrogen atmosphere such that the binder was cured.

<Electrolyte>

The components shown in Table 1 were mixed together such that the final concentration described in the parentheses was obtained, thereby preparing an electrolyte. That is, to a solvent which contained ethylene carbonate (EC) and diethylene carbonate (DEC) as non-aqueous solvents at a volume ratio of 30:70 (EC:DEC), 1,1,2,3,3,3-hexafluoropropylene difluoromethyl ether as an additive was added such that the final concentration of the additive became 10% by volume. Thereafter, as a supporting salt, lithium hexafluorophosphate was dissolved in the solvent such that the final concentration of the supporting salt became 1.2 mol/L, thereby preparing an electrolyte.

<Preparation of Lithium Ion Secondary Battery>

After being formed by the aforementioned method, the positive electrode and the negative electrode were laminated on each other with a porous film separator interposed therebetween, and the positive electrode lead tab 1B composed of an Al plate and the negative electrode lead tab 2B composed of a Ni plate were respectively welded, thereby preparing a battery element (see FIG. 1). The battery element was wrapped in an outer sheath 4 composed of an aluminum laminate film, three parts (three sides) of the resultant were sealed by heat sealing, and then the resultant was impregnated with the electrolyte in an appropriate degree of vacuum. Subsequently, under reduced pressure, the remaining one part (one side) of the resultant was sealed by heat sealing, thereby preparing a lithium ion secondary battery which had not yet been subjected to activation treatment.

<Step of Activation Treatment>

With regard to the prepared lithium ion secondary battery which had not yet been subjected to activation treatment, a cycle in which the secondary battery was charged up to 4.5 V by an electric current of 20 mA per 1 g of the positive electrode-active material and then discharged down to 1.5 V by applying an electric current of 20 mA per 1 g of the positive electrode-active material was repeated twice. Thereafter, the sealed portion (seal) was broken, such that the gas inside the battery was released and the internal pressure of the battery was reduced, and then the battery was sealed again. In this way, a lithium ion secondary battery of Example 1 according to the present invention was prepared.

Example 2

A lithium ion secondary battery was prepared in the same manner as in Example 1, except that, at the time of preparing the electrolyte, as a boron-based compound, a vinyl boronic acid (N-methyliminodiacetic acid) methyl ester was added such that the final concentration thereof became 0.09% by mass.

Example 3

A lithium ion secondary battery was prepared in the same manner as in Example 1, except that, at the time of preparing the electrolyte, a solvent which contained fluoroethylene carbonate (FEC) and diethylene carbonate (DEC) as non-aqueous solvents at a volume ratio of 50:50 was used.

Example 4

An electrolyte in which lithium hexafluorophosphate as a supporting salt was dissolved such that the final concentration thereof became 1.2 mol/L was prepared in the same manner as in Example 1, except that 2,2,3,3,4,4,5,5,5-nonafluoropentyl difluoromethyl ether as an additive was added to a solvent containing EC and DEC as non-aqueous solvent at a volume ratio of 30:70 (EC:DEC) such that the final concentration of the additive became 5% by volume.

As a modification example of the present example, an electrolyte to which 1,1,2,3,3,3-hexafluoropropylene difluoromethyl ether is added as a second additive in addition to the aforementioned additive such that the final concentration thereof becomes 10% by volume may be prepared.

Comparative Example 1

An electrolyte was prepared in the same manner as in Example 1, except that, at the time of preparing the electrolyte, the aforementioned additive (1,1,2,3,3,3-hexafluoropropylene difluoromethyl ether) was not added. Thereafter, a test was performed in the same manner as in Example 1.

Comparative Example 2

A test was performed in the same manner as in Example 1, except that, at the time of preparing the electrolyte, as the additive, instead of the additive used in Example 1, heptafluoropropyl-1,2,2,2-tetrafluoroethyl ether was added such that the final concentration thereof became 10% by volume.

The fluorinated chain-like ether compound of Comparative example 2 used herein is a compound in which an alkyl fluoride group having 3 carbon atoms and an alkyl fluoride group having 2 carbon atoms are bonded to an oxygen atom of an ether bond just like the aforementioned compound disclosed in Japanese Unexamined Patent Application, First Publication No. H11-26015 described above.

Reference Example 1

A test was performed in the same manner as in Example 1, except that, at the time of preparing the electrolyte, as a boron-based compound, instead of the boron-based compound used in Example 2, 2-allyl-4,4,5,5-tetramethyl-1,3,2-dioxabolane (allylboronic acid pinacol ester) was added such that the final concentration thereof became 0.09 wt %.

TABLE 1

| | Solvent (volume ratio) | Additive (% by mass) | Supporting salt (mol/L) |
|---|---|---|---|
| Example 1 | EC/DEC = 30/70 | 1,1,2,3,3,3-hexafluoropropyl difluoromethyl ether (10 wt %) | LiPF$_6$ (1.2 mol/L) |
| Example 2 | EC/DEC = 30/70 | 1,1,2,3,3,3-hexafluoropropyl difluoromethyl ether (10 wt %) + vinyl boronic acid (N-methyliminodiacetic acid) methyl ester (0.09 wt %) | LiPF$_6$ (1.2 mol/L) |
| Example 3 | FEC/DEC = 50/50 | 1,1,2,3,3,3-hexafluoropropyl difluoromethyl ether (10 wt %) | LiPF$_6$ (1.2 mol/L) |
| Example 4 | EC/DEC = 30/70 | 2,2,3,3,4,4,5,5,5-nonafluoropentyl difluoromethyl ether (5 wt %) | LiPF$_6$ (1.2 mol/L) |
| Comparative example 1 | EC/DEC = 30/70 | No additive | LiPF$_6$ (1.2 mol/L) |
| Comparative example 2 | EC/DEC = 30/70 | Heptafluoropropyl-1,2,2,2-tetrafluoroethyl ether (10 wt %) | LiPF$_6$ (1.2 mol/L) |
| Reference example 1 | EC/DEC = 30/70 | 1,1,2,3,3,3-hexafluoropropyl difluoromethyl ether (10 wt %) + 2-allyl-4,4,5,5-tetramethyl-1,3,2-dioxabolane (0.09 wt %) | LiPF$_6$ (1.2 mol/L) |

<Method for Evaluating Lithium Ion Secondary Battery>

In a constant-temperature bath with a temperature of 45° C., the lithium ion secondary battery prepared by the aforementioned method was charged up to 4.5 V by a constant current of 40 mA per 1 g of the positive electrode-active material and then continuously charged at a constant voltage of 4.5 V until a current of 5 mA flowed per 1 g of the positive electrode-active material. Thereafter, the battery was discharged down to 1.5 V by the electric current of 5 mA per 1 g of the positive electrode-active material, and the initial capacity thereof was measured. Furthermore, in a constant-temperature bath with a temperature of 45° C., the lithium ion secondary battery of which the initial capacity had been measured was charged up to 4.5 V by a constant current of 40 mA per 1 g of the positive electrode-active material and then continuously charged at a constant voltage of 4.5 V until a current of 5 mA flowed per 1 g of the positive electrode-active material. Subsequently, the battery was discharged down to 1.5 V by using an electric current of 40 mA per 1 g of the positive electrode-active material. This charge and discharge cycle was repeated 100 times. In addition, from a ratio of a discharge capacity (unit: mAh/g) obtained in each of the $20^{th}$ cycle, the $40^{th}$ cycle, the $60^{th}$ cycle, the $80^{th}$ cycle, and the $100^{th}$ cycle to the initial capacity (unit: mAh/g) obtained in the first cycle, a capacity retention rate after each cycle was determined.

Figure 2:
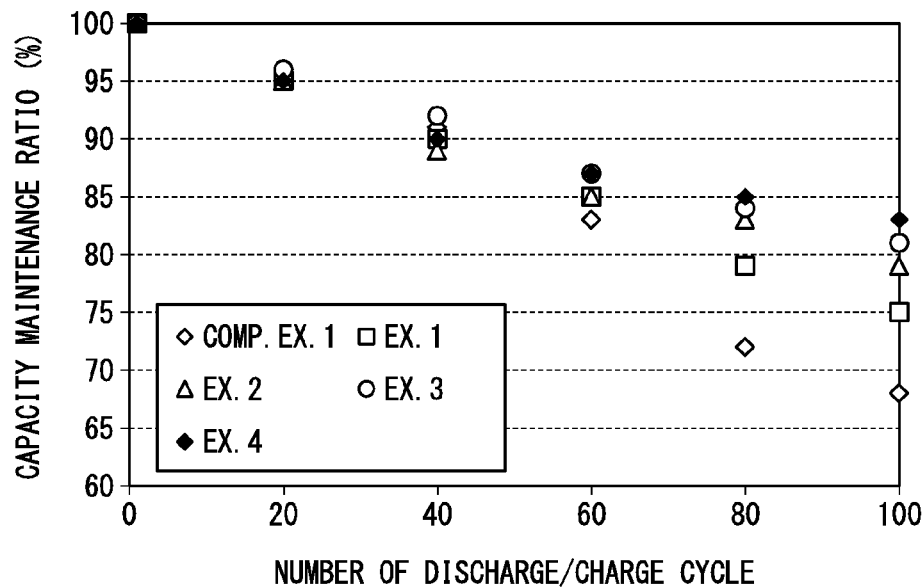
FIG. 2 is a graph in which Comparative example 1 and Examples 1 to 4 are plotted so as to show a relationship between a capacity retention rate % (ordinate) and the number of charge and discharge cycles (abscissa) of the prepared secondary battery.
Figure 3:
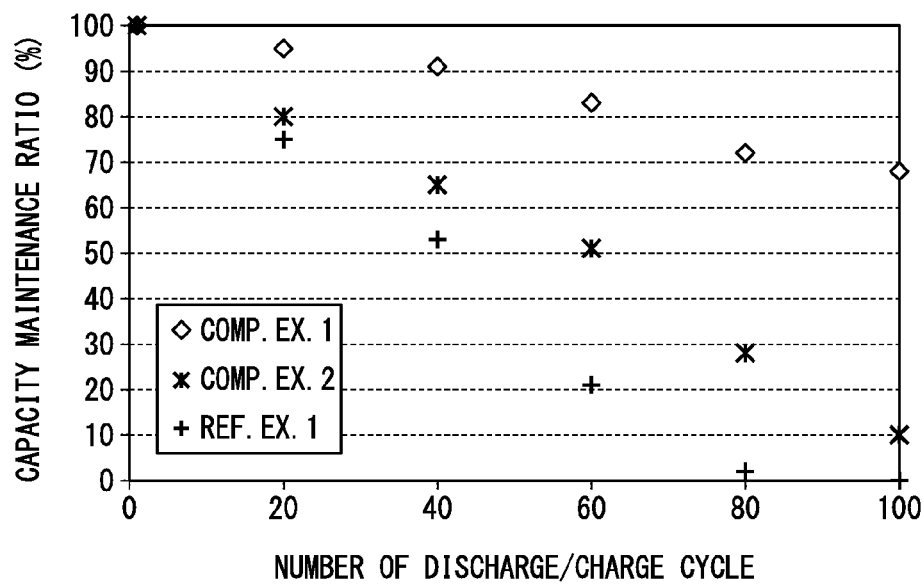
FIG. 3 is a graph in which Comparative examples 1 and 2 and Reference example 1 are plotted so as to show a relationship between a capacity retention rate % (ordinate) and the number of charge and discharge cycles (abscissa) of the prepared secondary battery.

The results of the evaluation performed as above are shown in Table 2. In Table 2, "cycle number" indicates the number of times the charge and discharge cycle is repeated (ordinal number of the cycle), and "capacity retention rate" indicates (discharge capacity (mAh/g) of the nth cycle)/ (discharge capacity (mAh/g) of the first cycle) (unit: %). The results are shown in the graphs of FIGS. 2 and 3.

TABLE 2

| Cycle number (number of times the cycle is repeated) | Capacity retention rate (%) | | | | | | |
|---|---|---|---|---|---|---|---|
| | Comparative example 1 | Example 1 | Example 2 | Example 3 | Example 4 | Comparative example 2 | Reference example 1 |
| 1 | 100 | 100 | 100 | 100 | 100 | 100 | 100 |
| 20 | 95 | 95 | 95 | 96 | 95 | 80 | 75 |
| 40 | 91 | 90 | 89 | 92 | 90 | 65 | 53 |
| 60 | 83 | 85 | 85 | 87 | 87 | 51 | 21 |
| 80 | 72 | 79 | 83 | 84 | 85 | 28 | 2 |
| 100 | 68 | 75 | 79 | 81 | 83 | 10 | 0 |

As is evident from the above results, even when being used in a state in which the voltage at the time of discharge is set to 4.5 V that is a potential higher than that of the conventional secondary batteries, the secondary batteries of Examples 1 to 4 exhibit a better capacity retention rate compared to Comparative examples 1 and 2. Particularly, the capacity retention rate of the secondary batteries of Examples 1 to 4 is markedly improved alter the 60$^{th}$ cycle. Furthermore, from the result of Reference example 1, it is understood that the addition of 2-allyl-4,4,5,5-tetramethyl-1,3,2-dioxabolane as a boron-based compound to the electrolyte, to which 1,1,2,3,3,3-hexafluoropropylene difluoromethyl ether has been added, should be avoided.

INDUSTRIAL APPLICABILITY

The present invention is applicable in the field of lithium ion secondary batteries.

REFERENCE SIGNS LIST 1 positive electrode
1A positive electrode current collector
1B positive electrode lead tab
2 negative electrode
2A negative electrode current collector
2B negative electrode lead tab
3 porous separator
4 outer sheath

The invention claimed is:

1. An electrolyte comprising:
a non-aqueous solvent;
a lithium salt; and
a fluorine-containing ether compound,
wherein the fluorine-containing ether compound is 2,2,3,3,4,4,5,5-nonafluoropentyl difluoromethyl ether.

2. The electrolyte according to claim 1,
wherein the content of the fluorine-containing ether compound is 1% by volume to 60% by volume with respect to the total amount of the electrolyte.

3. The electrolyte according to claim 1,
wherein the non-aqueous solvent is a solvent mixture of ethylene carbonate and diethylene carbonate.

4. The electrolyte according to claim 1,
wherein the non-aqueous solvent is a solvent mixture of fluorinated ethylene carbonate and diethylene carbonate.

5. The electrolyte according to claim 4,
wherein the content of the fluorinated ethylene carbonate is 30% by volume to 70% by volume with respect to the total amount of the non-aqueous solvent.

6. The electrolyte according to claim 1, further comprising a boron-based compound represented by the following Formula (B-1),

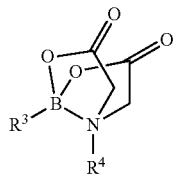

(B-1)

wherein
R$^3$ represents an alkyl group having 1 to 4 carbon atoms or an alkenyl group having 2 to 4 carbon atoms, and
R$^4$ represents an alkyl group having 1 to 4 carbon atoms.

7. The electrolyte according to claim 6,
wherein the content of the boron-based compound is 0.01% by mass to 5% by mass with respect to the total amount of the electrolyte.

8. The electrolyte according to claim 6,
wherein the content of the boron-based compound is equal to or less than 5 parts by mass with respect to 100 parts by mass of the fluorine-containing ether compound.

9. A lithium ion secondary battery comprising the electrolyte according to claim 1.

* * * * *